United States Patent
Fukuda (10) Patent No.: US 6,338,075 B2
(45) Date of Patent: *Jan. 8, 2002

(54) HYPERTEXT READER WHICH PERFORMS A READING PROCESS ON A HIERARCHICALLY CONSTRUCTED HYPERTEXT

(75) Inventor: Ryoji Fukuda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,185

(22) Filed: Jun. 25, 1998

(30) Foreign Application Priority Data

Jun. 30, 1997 (JP) ............................. 9-174745

(51) Int. Cl.[7] ............................. G06F 13/00
(52) U.S. Cl. ............ 707/501.1; 345/853; 345/760
(58) Field of Search ............................. 707/501, 513, 707/501.1; 345/333, 356, 357, 853, 854, 744–7, 760; 709/203, 217–219

(56) References Cited

U.S. PATENT DOCUMENTS

| | | | |
|---|---|---|---|
| 5,848,407 A | * | 12/1998 | Ishikawa et al. ............... 707/2 |
| 5,884,035 A | * | 3/1999 | Butman et al. ............... 709/218 |
| 5,890,172 A | * | 3/1999 | Borman et al. ............... 707/501 |
| 6,119,135 A | * | 3/1999 | Helfman ..................... 707/513 |
| 5,913,215 A | * | 6/1999 | Rubinstein et al. ............ 707/10 |
| 5,974,445 A | * | 10/1999 | Pivnichny et al. ........... 709/203 |
| 5,983,245 A | * | 11/1999 | Newman et al. ............. 707/513 |
| 5,991,798 A | * | 11/1999 | Ozaki et al. ................. 709/217 |
| 6,003,047 A | * | 12/1999 | Osmond et al. ............. 707/513 |
| 6,016,520 A | * | 1/2000 | Facq et al. ..................... 710/33 |
| 6,072,491 A | * | 6/2000 | Yohanan .................. 345/356 X |
| 6,195,679 B1 | * | 2/2001 | Bauersfeld et al. .......... 709/203 |
| 6,253,198 B1 | * | 6/2001 | Perkins ........................... 707/3 |
| 6,253,229 B1 | * | 6/2001 | Nielsen et al. .............. 709/203 |
| 6,256,028 B1 | * | 7/2001 | Sanford et al. .............. 345/841 |

* cited by examiner

*Primary Examiner*—Joseph H. Feild
(74) *Attorney, Agent, or Firm*—Fitzpatrick, Cella, Harper & Scinto (57) ABSTRACT

An automatic linking process of sequentially searching pages which are hierarchically constructed such as a WWW browser. Control is provided such that an instruction from an automatic linking instruction device is used as a trigger, and a first non-read anchor is searched by an anchor search device. If there is a non-read anchor, a hypertext of a network on the link destination side is accessed, and if there is no non-read anchor, a processing routine is returned to the original page. Thus, upon reading the hypertext, operability is improved due to the automatic linking process.

12 Claims, 9 Drawing Sheets

HYPERTEXT READER WHICH PERFORMS A READING PROCESS ON A HIERARCHICALLY CONSTRUCTED HYPERTEXT

BACKGROUND OF THE INVENTION

1. Field of the Invention

The invention relates to information processing apparatus and method and, more particularly, to a hyper text reader such as a WWW (World Wide Web) browser or the like for performing a reading process of a hyper text which is hierarchically constructed.

2. Related Background Art

As a technique of a conventional hyper text reader such as a WWW browser or the like, a "Navigator" (made by Netscape Co., Ltd.), an "Internet Explorer" (made by Microsoft Co., Ltd.), or the like is known.

Figure 8:
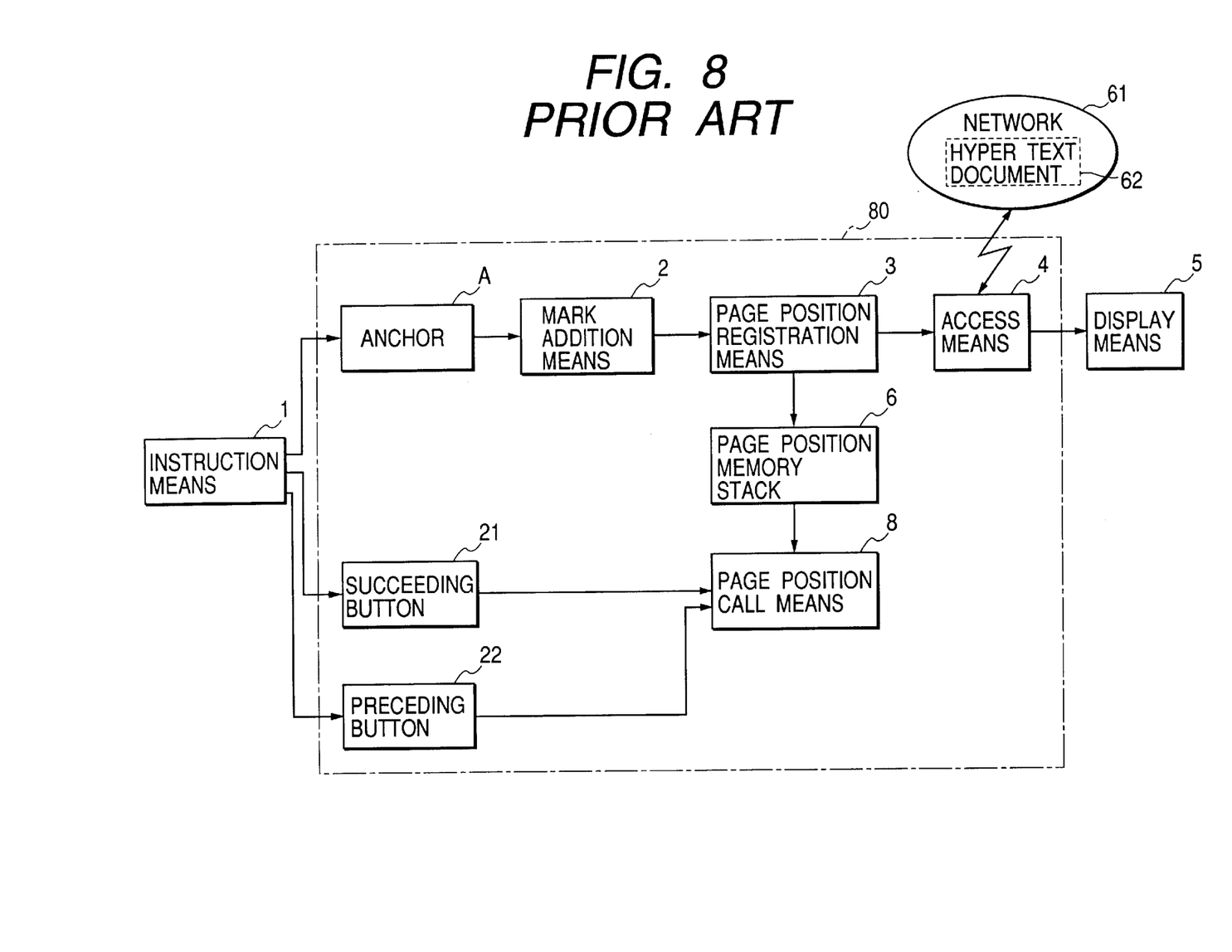
FIG. 8 is a block diagram showing a construction of a conventional browser.
Figure 9:
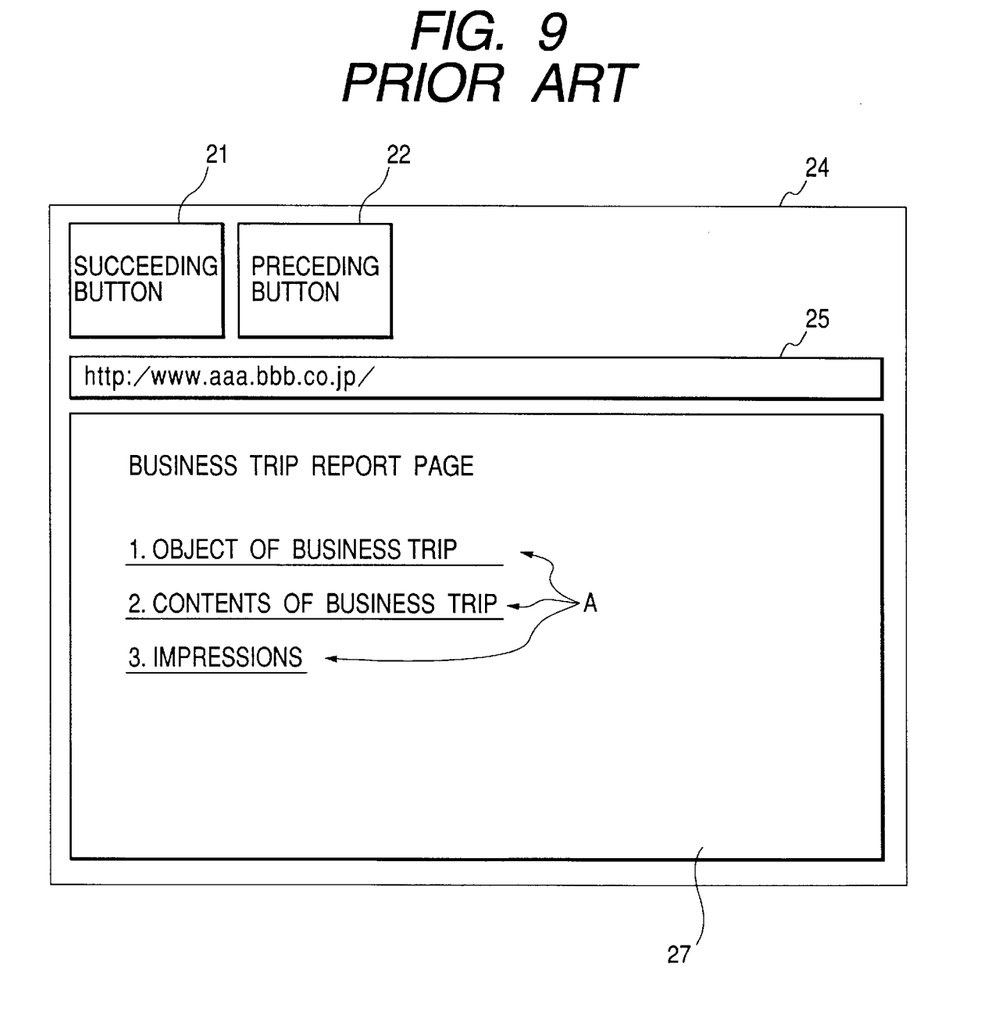
FIG. 9 is an explanatory diagram showing contents of the conventional browser displayed on the screen.

FIG. 8 shows a constructional example of a conventional hyper text reader. FIG. 9 shows expression contents of a conventional WWW browser 24 displayed on a display screen of display means 5 in FIG. 8. A conventional reading process of a hyper text document will now be described hereinbelow.

Hitherto, in case of reading a hyper text document 62 in a network 61 on the link destination side shown in FIG. 8, in a document of a page 27 which is hierarchically constructed and can be expressed by a display screen as shown in FIG. 9, a drawing object called an anchor A which is expressed by a text or an image shown by an underline, a highlight, or the like is instructed by using instruction means 1 such as mouse, keyboard, or the like, thereby accessing the link destination shown in the anchor A.

In this instance, a mark indicating that the document has already been read is added to the accessed anchor A by mark addition means 2. The present page position is registered into a page position memory stack 6 by page position registration means 3. The hyper text document 62 in the network 61 on the link destination side is searched by access means 4. A desired page of the accessed hyper text document 62 is displayed by the display means 5.

To return the display screen to an original page (business trip report page) 27, a preceding button 22 written as "BACK" or the like is instructed by the instruction means 1, so that page position call means 8 obtains a page position from the page position memory stack 6, thereby making it possible to access to the original page 27. The accessed original page 27 is displayed by the display means 5. Further, to progress the display screen to a next page, by instructing a succeeding button 21 by the instruction means 1, the apparatus can access to the next page by a process similar to that of the preceding button 22 and display. In a display screen as shown in FIG. 9 after the original page or next page was accessed as mentioned above, by instructing the anchor A by the instruction means 1, the hyper text document 62 can be read.

In the conventional construction as shown in FIGS. 8 and 9, to instruct the anchor A in the document in the page 27 which is hierarchically constructed, as mentioned above, first by instructing the succeeding button 21 or preceding button 22 by the instruction means 1, a target page to be read (for example, business trip report page) is displayed on the display screen. In the target page, by instructing the anchor A of the underlined document or the like by the instruction means 1, the hyper text document 62 is read through the access means 4.

To read the hyper text document 62 as mentioned above, the operations of the succeeding button 21 and preceding button 22 to change the display screen and the operation to instruct the anchor A to be accessed to the link destination have to be properly judged and executed each time by the operator. Particularly, in case of searching the anchor A which is not yet read, the pages which were hierarchically constructed have to be sequentially traced, it takes time for the processing operation and operability is poor.

Generally, in many cases, to fill up the formed hyper text document, the person who makes a page allows an anchor to link with an associated external page to be included. There is a case where whether the anchor is an anchor to be accessed to the outside or not cannot be discriminated if only characters or image written in the anchor are used. In such a case, according to conventional techniques, by moving a mouse cursor to a position over the anchor, the link destination of the anchor can be displayed in a part of the screen.

Since the link destination cannot be known if the mouse is not matched with position of the anchor by moving, in the case where the operator who executes the reading operation merely wants to obtain only information which is derived from a server of the accessed page, it is necessary to match the position of the mouse cursor with that of the anchor and to confirm the link destination every time, so that operability deteriorates.

SUMMARY OF THE INVENTION

An aspect of the invention is to provide a WWW browser which performs a reading process of a hierarchically constructed hypertext. The browser has an automatic linking process of sequentially searching pages of the hierarchically constructed hypertext. Control is provided such that an instruction from an automatic linking instruction device is used as trigger, and a first non-read anchor is searched by an anchor search device. If there is a no-read anchor, a hypertext of a network on the link destination side is accessed, and if there is no non-read anchor, a processing routine is returned to the original page.

DETAILED DESCRIPTION OF THE PREFERRED EMBODIMENTS

The invention will now be described in detail hereinbelow with reference to the drawings.

(a) First Embodiment

The first embodiment of the invention will be described with reference to FIGS. 1 to 5. Explanation about portions (refer to FIGS. 8 and 9) similar to those of the conventional technique is omitted and are designated by the same reference numerals as those in the conventional technique.

Figure 4:
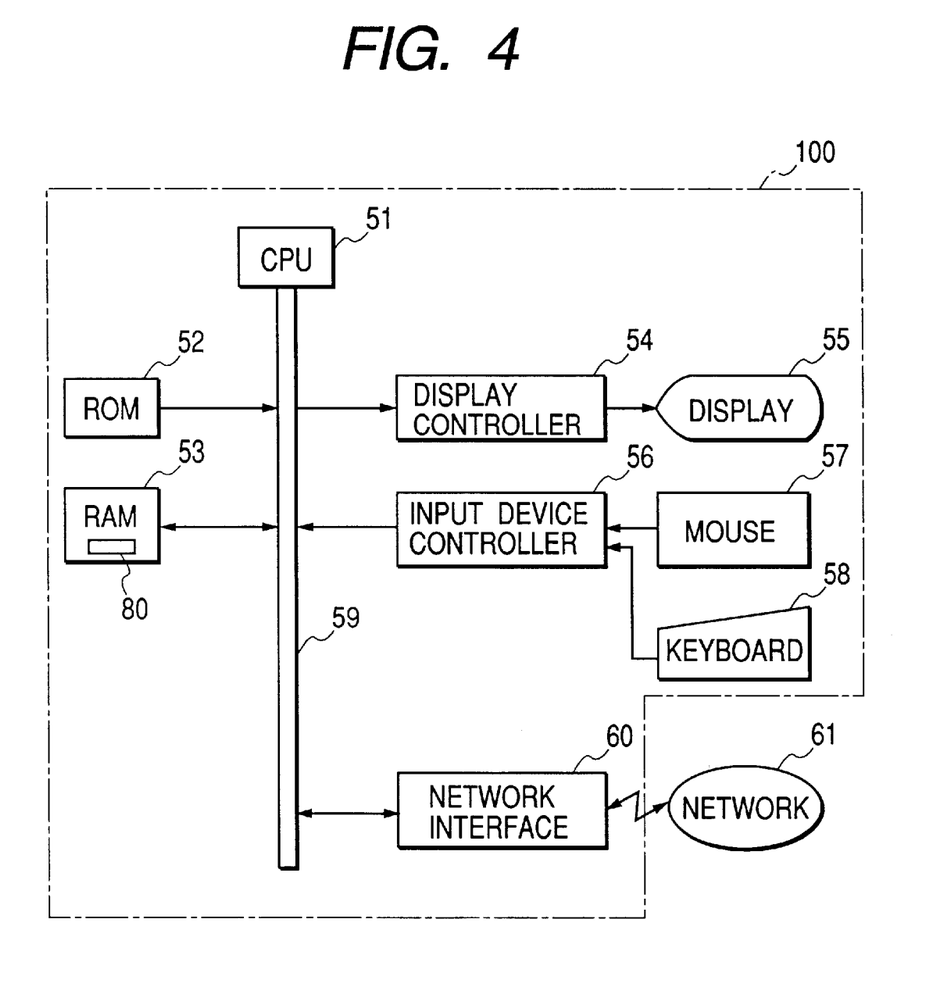
FIG. 4 is a block diagram showing a schematic construction of an information processing apparatus according to the invention.
Figure 5:
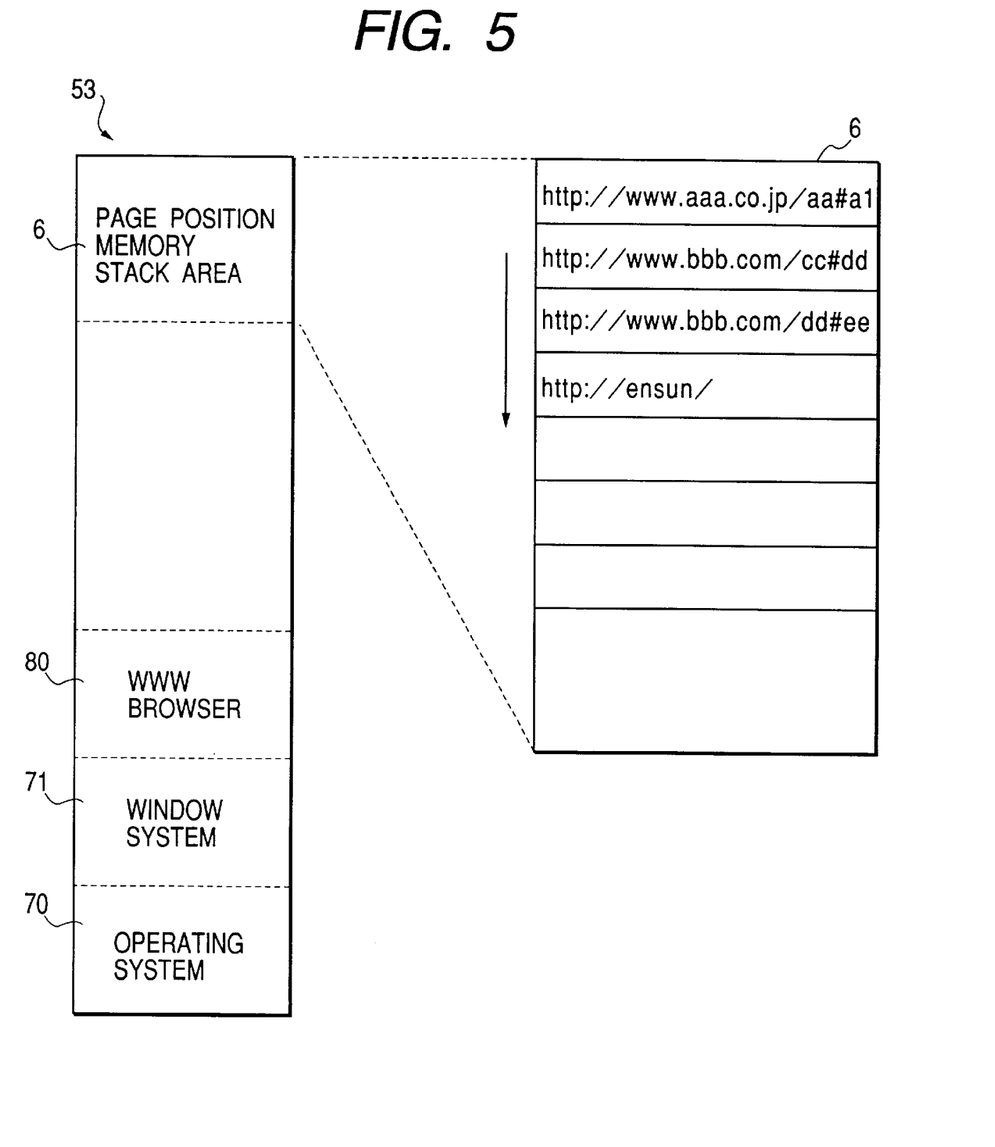
FIG. 5 is an explanatory diagram showing a memory map.

First, a whole construction of an information processing apparatus according to the embodiment will be described with reference to FIGS. 4 and 5. FIG. 4 shows a hardware construction of the apparatus. When a power source of an apparatus 100 is turned on, as shown in FIG. 5, an operating system (OS) 70 and a Window system 71 which have previously been stored in a ROM 52 are activated from a CPU 51. Data processes are executed through a bus 59 by using a RAM 53 as a main storage. A display controller 54, an input device controller 56, and a network interface 60 start to operate, respectively.

Figure 1:
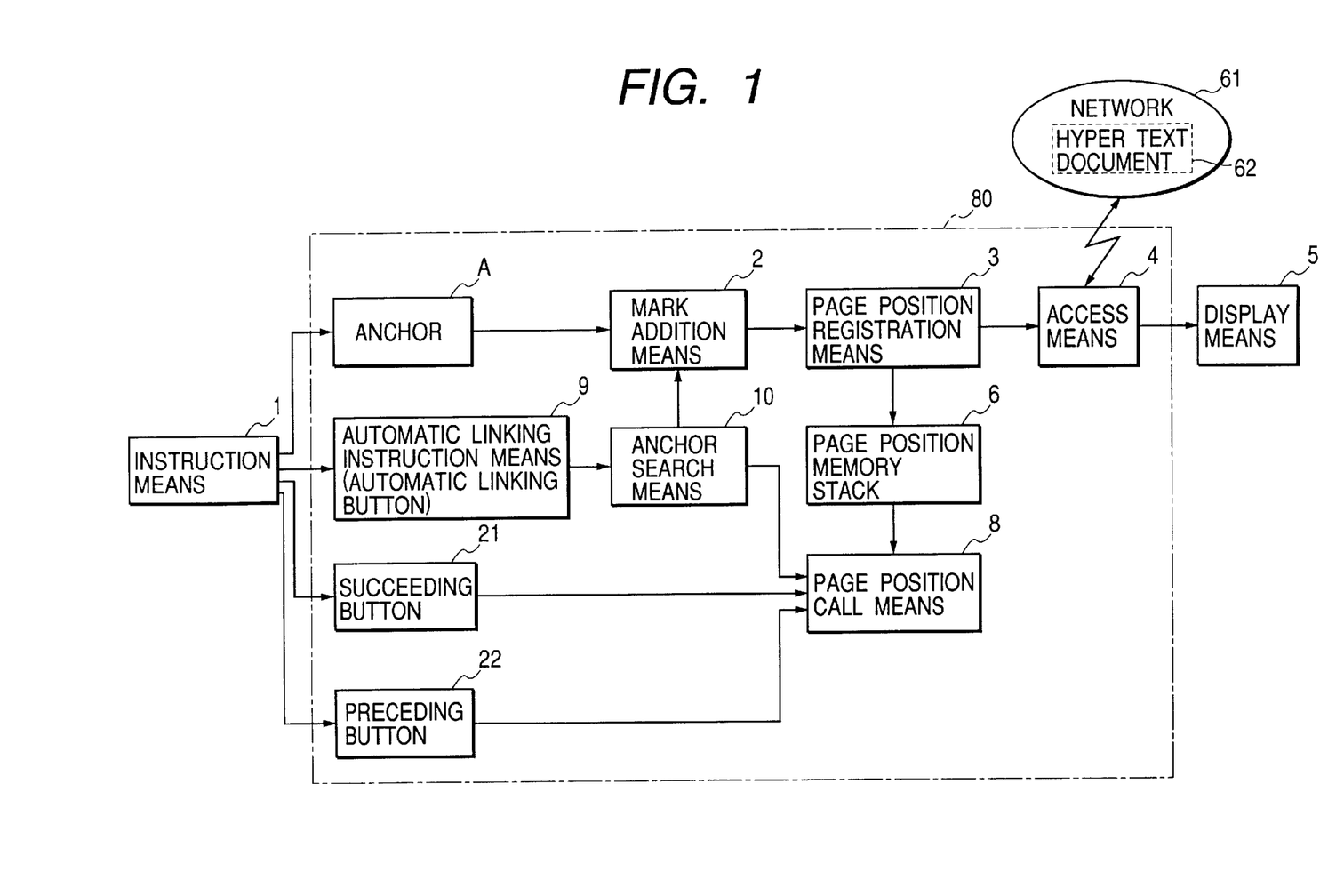
FIG. 1 is a block diagram showing a construction of a browser according to the first embodiment of the invention.

A display is performed by a display apparatus 55 on the display means 5 (FIG. 1). By operating a mouse 57 or a keyboard 58, it is possible to access the network 61.

Figure 2:
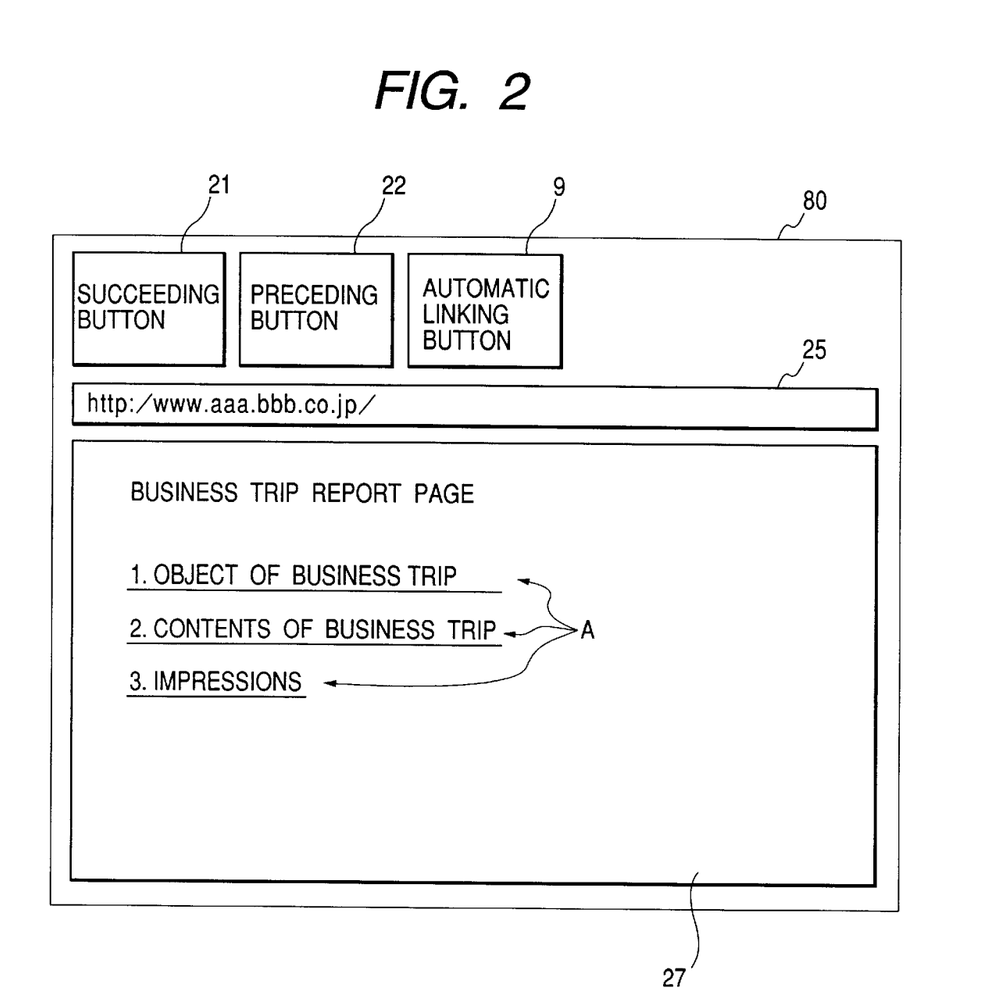
FIG. 2 is an explanatory diagram showing the contents of a browser displayed on a screen.

FIG. 5 shows a memory map of the RAM 53 as a main storage when the data processes are executed. In addition to the foregoing operating system 70 and window system 71, a page position memory stack area 6 to store a page position, a WWW browser 80 having a graphical user interface as shown in FIG. 2 by which the data processes according to the invention are executed, and the like have been stored in the RAM 53. An executing program of the WWW browser 80 is shown in a flowchart of FIG. 3, which will be explained hereinlater. The WWW browser 80 constructed by such software is stored in the ROM 52 or RAM 53. However, it can also be stored as a separate device into a memory medium such as a floppy disk or the like.

The WWW browser used here denotes software for reading a hyper text called an HTML (Hyper Text Markup Language) format constructed on the internet on the basis of an HTTP (Hyper Text Transfer Protocol).

The construction of the WWW browser 80 according to the embodiment will now be described with reference to FIGS. 1 and 2. FIG. 1 shows a block diagram of the construction of the WWW browser 80. In FIG. 1, the anchor A, succeeding button 21, preceding button 22, mark addition means 2, page position registration means 3, access means 4, page position memory stack 6, and page position call means 8 are similar to those in the construction of the conventional WWW browser 24 mentioned above.

In the embodiment, automatic linking button 9 serving as automatic linking instruction means and an anchor search means 10 are newly provided. The automatic linking button 9 instructs the start to perform the automatic linking of the page 27 which is hierarchically constructed as shown in FIG. 2. The anchor search means 10 searches the non-read anchor A in the hierarchically constructed pages 27 on the basis of the start instruction for the automatic linking by the automatic linking button 9.

FIGS. 1 and 4 will now be mutually referred. The WWW browser 80 is stored in the ROM 52 or RAM 53. The access means 4 corresponds to the network interface 60. The instruction means 1 corresponds to the mouse 57 or keyboard 58.

A flow of the automatic linking process according to the embodiment will now be described with reference to the flowchart shown in FIG. 3. When the WWW browser 80 accesses to a URL (Uniform Resource Locator) set by the user, a page on the access destination side can be read and the apparatus enters the subsequent input waiting mode as shown in FIG. 2.

Figure 3:
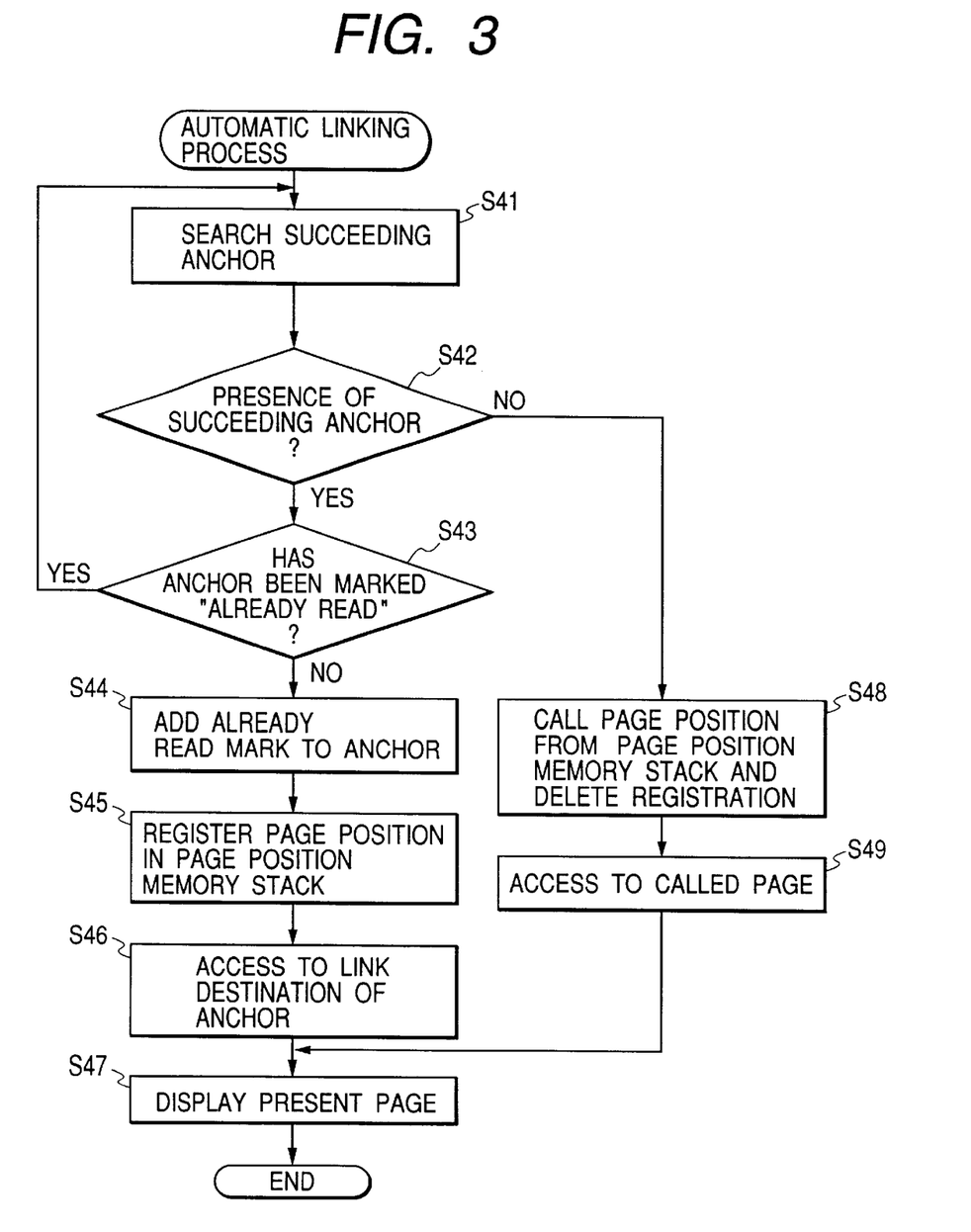
FIG. 3 is a flowchart showing an automatic linking process according to the invention.

When the automatic linking button 9 is clocked by the mouse 57, an automatic linking process shown in the flowchart of FIG. 3 is executed. A main routine and the other processes are similar to those of the existing WWW browser and the details of those processes are omitted here.

In step S41, the next anchor is searched. In step S42, whether the next anchor A exists or not is discriminated from a result in step S41. If the anchor A exists, step S43 is executed. If NO, step S48 is executed.

In step S43, a check is made to see if an "already read" mark (showing that the anchor has already been read) has been added to the searched anchor A. If YES, the processing routine is returned to step S41 and the next anchor A is searched. In this case, to show the addition of the "already read" mark, it is desirable to perform a process such that a color of an underline indicative of the anchor A changes, a character is inverted, or the like. If the "already read" mark is not added to the searched anchor A, step S44 is executed.

In step S44, the "already read" mark is added to the searched anchor A. In step S45, the present page position is registered into the page position memory stack 6 and a stack pointer is updated. In step S46, the hyper text document 62 on the network 61 as a link destination corresponding to the searched anchor A is accessed. In step S47, the accessed page is displayed and the automatic linking process is finished.

In step S48, since the anchor as a search result does not exist, the page position is called from the page position memory stack 6, the page position registered in the stack is deleted, and the stack pointer is returned. In step S49, the page position called from the page position memory stack 6 is accessed and step S47 is executed. Since the operation for the automatic linking process as mentioned above can be easily performed by merely repeating the clicking operation of the automatic linking button 9, the operability can be improved.

(b) Second Embodiment

Figure 6:
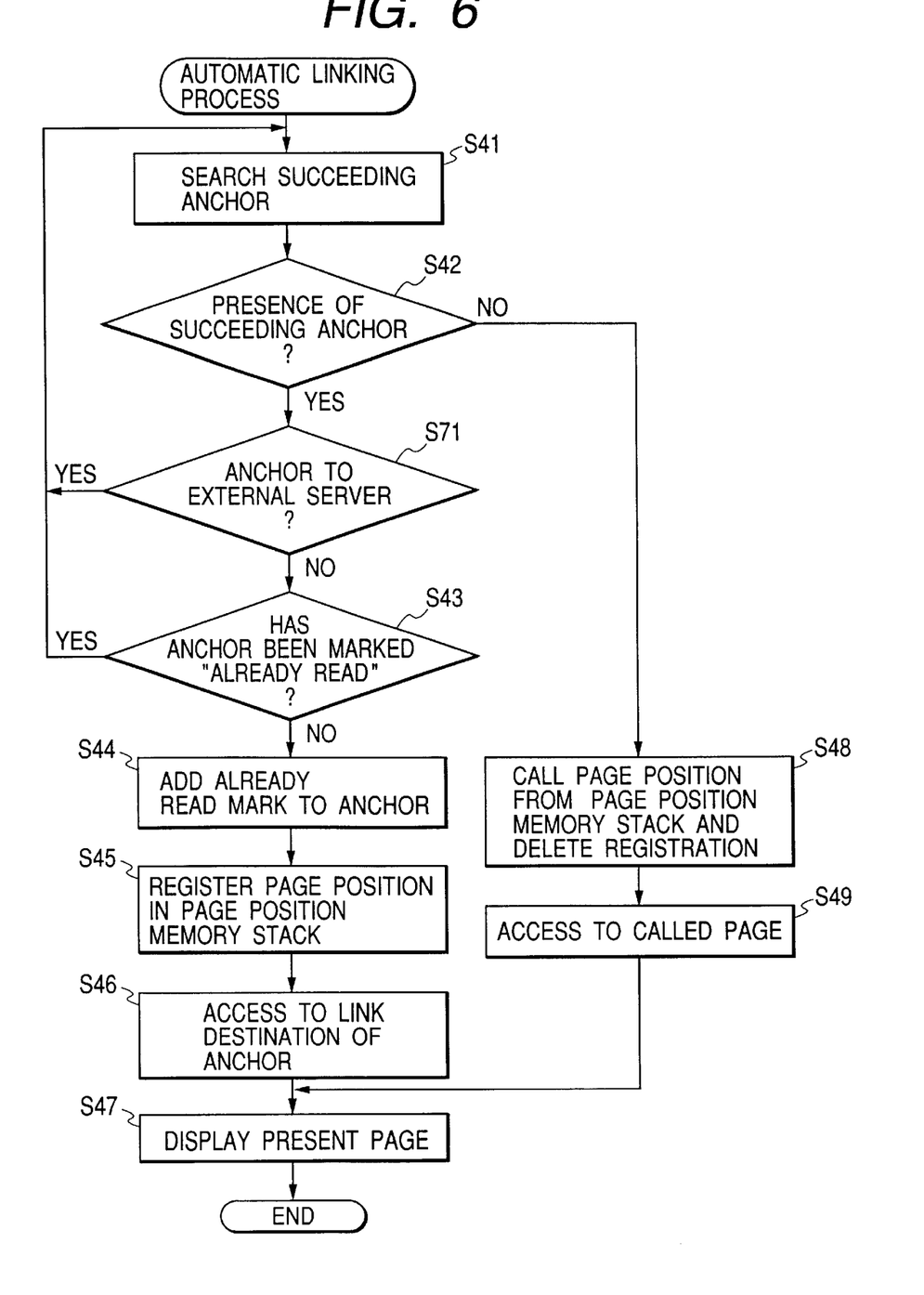
FIG. 6 is a flowchart showing an automatic linking process according to the second embodiment of the invention.

The second embodiment of the invention will now be described with reference to FIGS. 6 and 7. Explanation with respect to portions similar to those in the foregoing first embodiment is omitted.

The embodiment is an example in case of changing searching conditions of the anchor in the WWW browser 80 described in the foregoing first embodiment.

Figure 7:
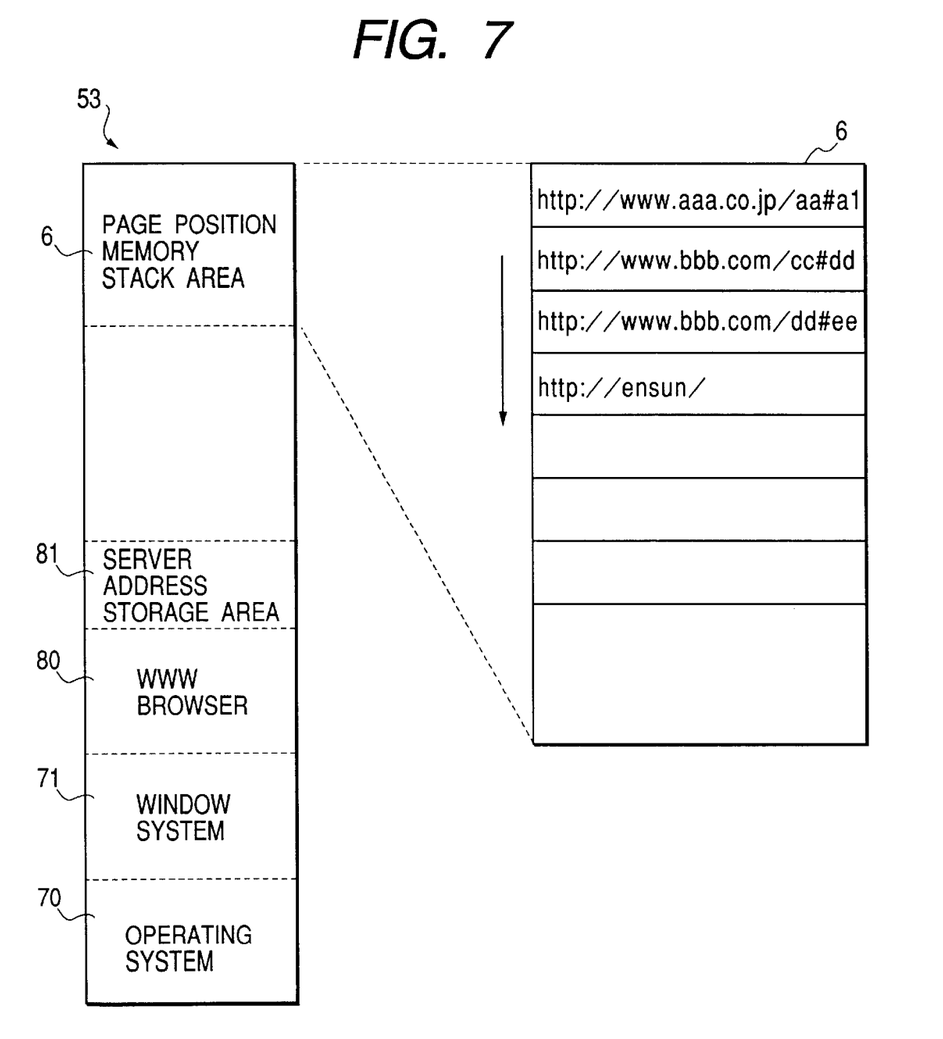
FIG. 7 is an explanatory diagram showing a memory map.

FIG. 7 is a memory map showing a server address storage area 81 newly assured in the RAM 53. An IP address of the WWW server which is at present being accessed is stored here. The IP address of the WWW server is added to the searching conditions. By limiting the searching conditions into a server of the page that is at present being accessed, only target information can be read without diverging the access to the outside.

A flow for the automatic linking process will now be described with reference to a flowchart of FIG. 6. Since steps S41, S43, S44, S45, S46, S47, S48, and S49 are similar to those in the flowchart of FIG. 3 of the foregoing first embodiment, their descriptions are omitted.

In step S42, if the searching condition is YES, step S71 is executed. In step S71, a check is made to see if the searched anchor is the anchor to the external server. If it is the anchor to the external server, step S41 is executed. If NO, step S43 is executed. That is, in the embodiment, the searching conditions are limited in the server of the page which is at present being accessed so as not to diverge the access to the outside.

By executing the processes as mentioned above, only the target page on the WWW server can be read by the automatic linking button 9 without being anxious about whether or not the access is a link to the outside. The operability can be further improved.

According to the embodiment as described above, in the hyper text reader such as a WWW browser or the like, an instruction from the automatic linking instruction means is used as a trigger and the first non-read anchor is searched by the anchor search means. If there is the non-read anchor, the link destination is accessed. If there is no non-read anchor, the processing routine is returned to the original page. Therefore, by performing only the simple operation such that the automatic linking instruction means is merely repetitively continuously depressed, the pages which are hierarchically constructed can be sequentially traced, so that the operability can be improved.

According to the embodiment, since the condition about whether or not the searched anchor is the anchor to the external server is added to the searching conditions, the searching conditions are limited to the server of the page that is at present being accessed and the page can be read. Thus, the operability can be further improved.

What is claimed is:

1. A hypertext browsing apparatus for accessing a linked page represented by an anchor in a hypertext, comprising:

instruction means for issuing an instruction to start a browsing of a page linked with a currently displayed page without designating any anchors;

anchor search means for searching the currently displayed page for an anchor in response to the instruction issued by said instruction means;

anchor determination means for, when an anchor has been found by said anchor search means, determining whether or not the found anchor is marked as an already-read anchor corresponding to a page which has already been read;

search control means for, if the found anchor is determined to be the already-read anchor by said anchor determination means, controlling said anchor search means so as to search the currently displayed page for another anchor;

page access means for, if the found anchor is not determined to be the already-read anchor by said anchor determination means, accessing to the page corresponding to the found anchor; and marking means for marking the anchor corresponding to the page accessed by said aid page access means as the already-read anchor.

2. An apparatus according to claim 1, further comprising:

memory means for storing a page position;

registration means for registering a position of a page which has bene already read into said memory means;

page position call means for calling the page position stored in said memory means if all the anchors found by said anchor search means are determined to be already-read anchors; and control means for controlling said page access means so as to return to the already-read page on a basis of the called page position.

3. An apparatus according to claim 1, further comprising:

server address storage means for storing an address of a server currently accessed;

address determination means for determining whether or not an address of a page correspond to the found anchor belongs to the address of the server; and determination control means for controlling said anchor determination means so as to restrict a subject of anchor determination to the anchor belonging to the address of the server.

4. An apparatus according to claim 1, further comprising display means for displaying content of the page accessed by said page access means.

5. A hypertext browsing method of accessing a linked page represented by an anchor in a hypertext, comprising:

an instructing step of issuing an instruction to start a browsing of a page linked with a currently displayed page without designating any anchors;

an anchor searching step of searching the currently displayed page for an anchor in response to the instruction issued in said instruction step;

an anchor determination step of, when an anchor has been found by said anchor search step, determining whether or not the found anchor is marked as an already-read anchor corresponding to a page which has been already read;

a search control step of, if the found anchor is determined to be the already-read anchor by said anchor determination step, controlling said anchor search step so as to search the currently displayed page for another anchor;

a page access step of, if the found anchor is not determined to be the already-read anchor in said anchor determination step, accessing to the page corresponding to the found anchor; and a marking step of marking the anchor corresponding to the page accessed by said page access step as the already-read anchor.

6. A method according to claim 5, further comprising:

a step of registering a position of a page which has been already read into a memory area;

a step of calling the page position stored in said memory area if all the anchors found in said anchor searching step are determined to be already-read anchors; and a control step of controlling said page access step so as to return to the already-read page on a basis of the called page position.

7. A method according to claim 5, further comprising:

a server address storage step of storing an address of a server currently accessed;

an address determination step of determining whether or not an address of a page corresponding to the found anchor belongs to the address of the server; and a determination control step of controlling said anchor determination step so as to restrict a subject of anchor determination to the anchor belonging the address of the server.

8. A method according to claim 5, further comprising a displaying step of displaying content of the page accessed by said page access step.

9. A recording medium in which an accessing control program for allowing a computer to control an accessing operation of a linked page represented by an anchor in a hypertext has been recorded, wherein said accessing control program allows the copter to execute the steps of:

an instructing step of issuing an instruction to start a browsing of a page linked with a currently displayed page without designating any anchors;

an anchor searching step of searching the currently displayed page for an anchor in hierarchically constructed pages on a bases of said response to the instruction issued by said instruction step;

an anchor determination step of, when an anchor has been found by said anchor searching step, determining whether or not the found anchor is marked as an already-read anchor corresponding to a page which has been already read;

a search control step of, if the found anchor is determined to be the already-read anchor by said anchor determination step, controlling said anchor searching step so as to search the currently displayed page for another anchor;

a page access step of, if the found anchor is not determined to be the already-read anchor by said anchor determination step, accessing to the page corresponding to the found anchor; and a marking step of marking the anchor corresponds to the page accessed by said page access means as the already-read anchor.

10. A medium according to claim 9, wherein said accessing control program further comprises the steps of:

a registering step of registering a position of a page which has been already read into a memory area;

a page position calling step of calling the page position stored in said memory area if all the anchors found by said anchor searching step are determined to be already-read anchors; and a control step of controlling said page accessing step so as to return to the already-read page on a basis of the called page position.

11. A medium according to claim 9, wherein said accessing control program further comprises the steps of:

a server address storage step of storing an address of a server currently accessed;

an address determination step of determining whether or not an address of a page corresponding to the found anchor belongs to the address of the server; and a determination control step of controlling said anchor determination step so as to restrict a subject of anchor determination to the anchor belonging to the address of the server.

12. A medium according to claim 9, wherein said accessing control program further comprises a ste of displaying content of the page accessed by said page accessing step.

* * * * *

UNITED STATES PATENT AND TRADEMARK OFFICE
CERTIFICATE OF CORRECTION

PATENT NO. : 6,338,075 B2
DATED : January 8, 2002
INVENTOR(S) : Ryoji Fukuda

It is certified that error appears in the above-identified patent and that said Letters Patent is hereby corrected as shown below:

Column 1,
Line 9, "hyper text" should read -- hypertext --;
Lines 11, 20 and 23, "hyper text" should read -- hypertext --;
Line 29, "FIG. 9 ," should read -- FIG. 9, --;
Lines 38 and 40, "hyper text" should read -- hypertext --; and
Lines 55 and 66, "hyper text" should read -- hypertext --.

Column 2,
Lines 1 and 10, "hyper text" should read -- hypertext --.

Column 3,
Line 36, "hyper text" should read -- hypertext --.

Column 5,
Line 9, "hyper text" should read -- hypertext --; and
Line 56, "bene" should read -- been --.

Column 6,
Line 2, "correspond" should read -- corresponding --;
Line 53, "belonging" should read -- belonging to --; and
Line 62, "copter" should read -- computer --.

Column 7,
Line 3, "bases" should read -- basis --; and
Line 19, "corresponds" should read -- corresponding --.

UNITED STATES PATENT AND TRADEMARK OFFICE
CERTIFICATE OF CORRECTION

PATENT NO. : 6,338,075 B2
DATED : January 8, 2002
INVENTOR(S) : Ryoji Fukuda It is certified that error appears in the above-identified patent and that said Letters Patent is hereby corrected as shown below:

<u>Column 8,</u>
Line 22, "ste" should read -- step --.

Signed and Sealed this

Eleventh Day of February, 2003

JAMES E. ROGAN
*Director of the United States Patent and Trademark Office*